United States Patent [19]

Kato

[11] 4,266,527
[45] May 12, 1981

[54] DEVICE FOR PREVENTING OIL SPLASHING AND FIRE OCCURRENCE IN FRYING PAN

[76] Inventor: Kyosuke Kato, 58-22, Gejohcho, Kasugai City, Aichi Prefecture, Japan, 486

[21] Appl. No.: 908,669

[22] Filed: May 23, 1978

[30] Foreign Application Priority Data

Jun. 3, 1977 [JP] Japan .................................. 52-66062

[51] Int. Cl.³ .............................................. F24C 15/20
[52] U.S. Cl. ................................ 126/299 C; 126/389; 220/335
[58] Field of Search .............. 126/373, 389, 381, 382, 126/299 C, 214 D; 99/403; 220/335, 334, 85 CH, 345; D7/41, 131

[56] References Cited

U.S. PATENT DOCUMENTS

| | | | |
|---|---|---|---|
| Re. 17,370 | 7/1929 | Smith | 126/381 X |
| 576,887 | 2/1897 | Pratt | 220/335 |
| 656,855 | 8/1900 | Pimlott | 126/299 C |
| 948,941 | 2/1910 | Andreas et al. | 126/389 X |
| 1,395,554 | 11/1921 | Brown | 220/335 |
| 1,807,271 | 5/1931 | Asadoorian | 126/299 C |
| 2,350,243 | 5/1944 | MacKay | 129/299 C X |
| 2,826,327 | 3/1958 | Gerhardt | 220/335 |
| 2,888,162 | 5/1959 | Herpich | 220/334 |
| 3,930,594 | 1/1976 | Jungmann | 220/335 |

Primary Examiner—Samuel Scott
Assistant Examiner—Randall L. Green
Attorney, Agent, or Firm—Fred Philpitt

[57] ABSTRACT

A frying pan used for cooking food is provided with a lid covering the entire open part of the frying pan, and this lid is inclined on its top surface, and an opening for placing the cooking food is provided in this inclined surface, and a transparent lid plate is provided over the opening to enable a user to see into the inside of the frying pan. A gas discharging passageway is provided between the lid plate and the edge of the opening portion of the lid, and the lid plate is provided with an opening/closing mechanism for closing the lid.

3 Claims, 7 Drawing Figures

DEVICE FOR PREVENTING OIL SPLASHING AND FIRE OCCURRENCE IN FRYING PAN

BACKGROUND OF THE INVENTION

The present invention relates to a device for preventing oil splashing and fire occurrence in a frying pan, and particularlary to a lid device wherein a lid installed on the frying pan proper covering the entire opening surface of the frying pan proper is provided with a lid plate covering an opening portion for placing a cooking food, and the lid plate is formed of a transparent body to enable a user to see through to the inside of the frying pan and an opening/closing mechanism is provided on the lid plate so that when the lid plate is closed over the frying pan, a gap is formed between the lid plate and the edge of the opening portion of the lid, and a gas discharging passageway is provided with a gap formed between the lid plate and the edge of the opening portion of the lid to cause the gas to have a curved flow.

Heretofore, when the frying of a cooking food has been performed by using an edible oil, as a means of preventing oil from splashing during the frying and preventing a flame from developing, it has generally been practiced to apply a lid over the frying pan. However, several drawbacks occur. Although a lid will usually prevent the oil from splashing and prevent the occurrence of fire, since the lid itself is opaque, observation of the inside of the frying pan cannot be made. If the lid is made of transparent material such a large volume of vapor is generated inside of the frying pan that the transparent lid made on purpose is soon tarnished, thus preventing observation under the lid.

SUMMARY OF THE INVENTION

An object of the present invention is to provide a lid covering the entire part of an opening surface of the frying pan which prevents the oil from splashing the frying pan during the cooking.

Another object of the present invention is an improvement of the invention, entitled, frying pan splash shielding device, which was awarded with U.S. Pat. No. 3,857,381.

A further object of the present invention resides in that a top surface of the lid is inclined, and a lid plate provided over an opening portion in the lid with an inclination corresponding to the inclined surface of any lid, and as a result, the oil droppings imping against the lid plate are caused to flow down the inclination.

A still further object of the invention is to provide a lid having a gas discharging passageway including a ventilating gap have a curved path between the opening portion in the lid and the lid plate so that the oil propelled upwardly is prevented from splashing the outside.

A more specific object of the present invention is to provide a lid having a gas discharging passageway including a ventilating gap having a curved path between the opening portion and the lid plate, whereby the vapor or oil smoke developed in the frying pan is discharged thus preventing the lid plate from being tarnished and assuring that the condition inside of the frying pan can be observed through the lid plate.

A particular object of the invention resides in that the ventilating gap between the opening portion and the lid plate is formed to a minimum size to prevent the inflow of the air from the outside and oxygen scarcity condition in the frying pan is promoted and as a result, contributes to the prevention of the occurrence of the fire.

BRIEF DESCRIPTION OF THE DRAWINGS

FIG. 1 is a perspective view of a frying pan with a lid on.

DETAILED DESCRIPTION OF THE INVENTION

Figure 1:
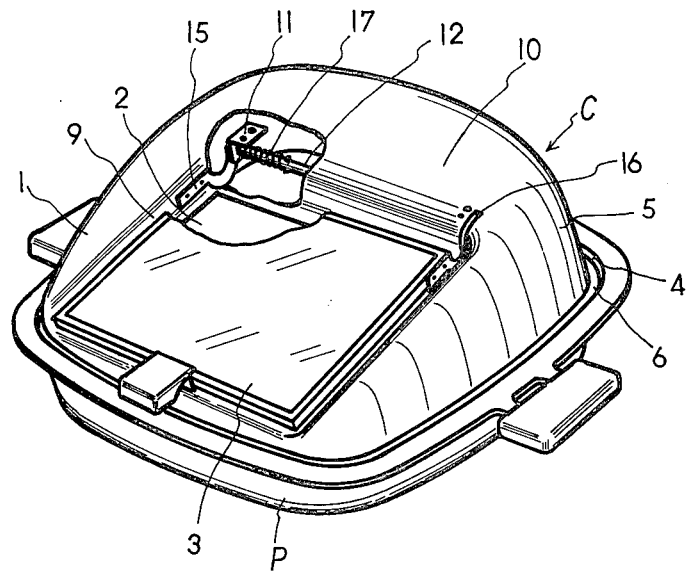

The frying pan proper according to the present invention is shown generally by the letter P, and a lid C is mounted on the frying pan P, and this lid C has an inclined surface 1 on its top surface and is formed with an opening portion 2 for charging a cooking food, and a transparent lid plate 3 is provided over this opening portion 2, and a gas discharging passageway is formed between the opening portion 2 and the lid plate 3.

The frying pan P is formed in angular shape, and a stepped portion 4 is provided to support the lid C.

The lid C is molded from metal plate or is made or porcelain and is shaped in angular form corresponding to the shape of the frying pan proper P, and the inclined surface of the lid C is inclined with moderate angle forward in the downward direction from a raised wall 5 of a back surface. On the peripheral edge of the lower end of the lid C, a flange 6 bulging slightly outwardly is integrally formed, and the lid C is supported on the stepped portion 4 of the frying pan P by means of the flange 6, and the lid C is mounted on the frying pan P removably.

Figure 4:
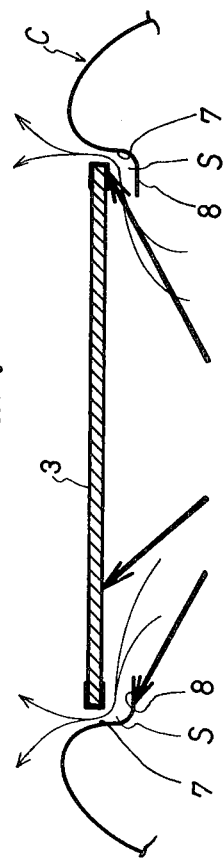
FIG. 4 is a cross section of an essential part of the frying pan showing the condition where the gas developed inside of the frying pan is discharged in a curved flow through the gap formed between the opening portion of the lid and the lid plate.

The gas discharging passageway is constructed in such a way that the outer contour of the opening portion 2 of the lid C is shaped in rectangular form, and the entire edge of the opening portion 2 is so shaped that the vertical wall portion 7 which is bent downward is integrally extended as shown in FIG. 4, and the end of the vertical wall portion 7 is provided with a flange portion 8 extending in curved form in the horizontal direction to form a hollow portion 9. The lid plate 3 is shaped in rectangular form with a dimensionto provide a slight gap between the lid plate 3 and the vertical wall portion 7 of the hollow portion 9 formed on the opening portion 2 of the lid C, and when the lid plate 3 is closed by th opening/closing mechanism provided at the top portion 10 of the lid C, a slight gap is retained between the lid plate 3 and the flange 8 of the hollow portion 9, and a ventilating gap having an S-like curved path is formed so that the vapor rising from the space within the frying pan P or the gas of the oil smoke can pass through.

Figure 2:
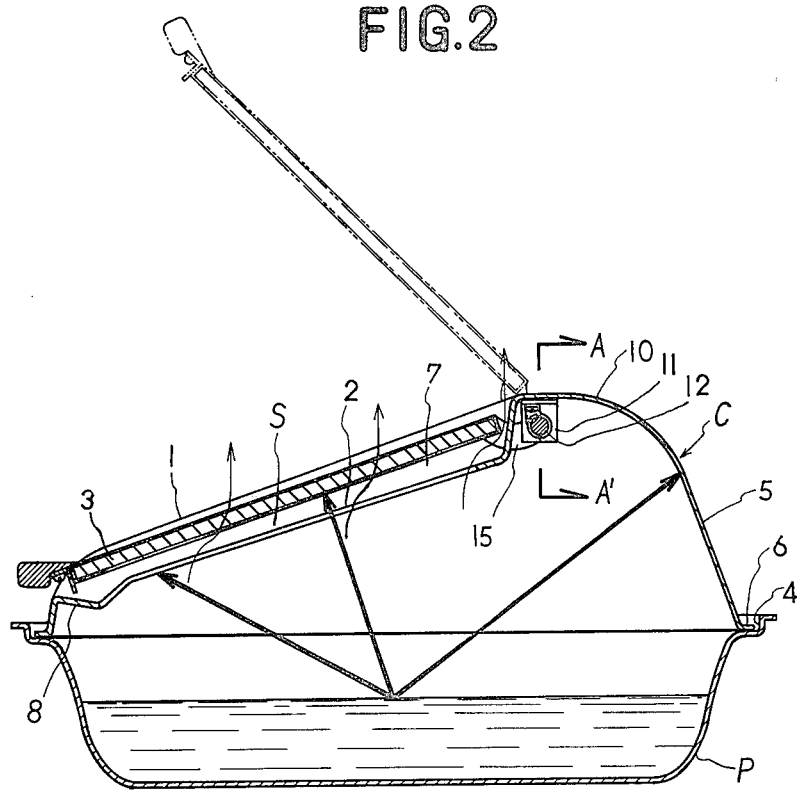
FIG. 2 is a vertical cross section of the frying pan in FIG. 1.
Figure 3:
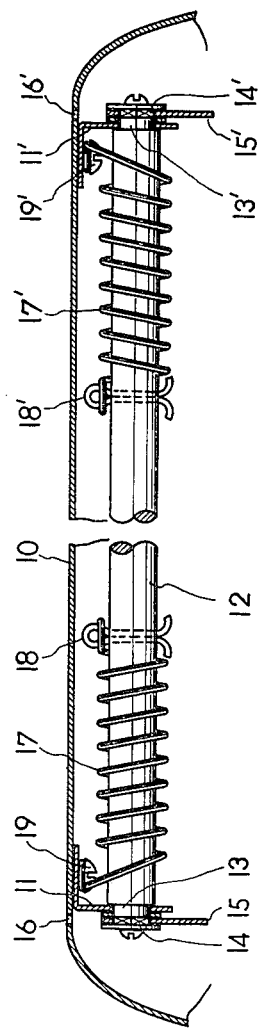
FIG. 3 is a cross section taken along a line A-A' of FIG. 2.

The opening/closing mechanism for mounting the lid plate 3 on the lid C is arranged in such a way, as shown in FIGS. 2 and 3, that an operating shaft 12 is axially fitted rotatably with its reduced diameter portions 13, 13' formed at both its ends on bearing members 11, 11' of L-shape which are screwed or welded to left and right end portions of the inside surface of the top portion 10 of the raised wall 5 of the lid C, and base end portions of rocking arm members 15, 15' are integrally fixed to short shaft portions 14, 14' of angular shape extending and projecting to the reduced diameter portions 13, 13' so that the rocking arm members 15, 15' are interlockingly moved according to the turning of the operating shaft 12, and the rocking arm members 15, 15' are projected outward from elongate guide notched portions 16, 16' formed on the lid C, and the ends of the rocking arm members 15, 15' are fixed to the top portion of the lid plate 3. Springs 17, 17' are wound on the left and right of the operating shaft 12, and the respective inner end portions of the springs 17, 17' are fixed to the operating shaft 12 by means of pins 18, 18', and the outer end portions are fixed to the bearing members 11, 11' by means of screws 19, 19'.

The elongate guide notched portions 16, 16' are set to dimension controlling the opening/closing angle of the base plate 3. When the base end portions of the rocking arm members 15, 15' and the short shaft portions 14, 14' of the operating shaft 12 are fixed, the operating shaft 12 is previously twisted to turn, and the turning elastic force is caused to accumulate on the wound springs 17, 17' joined to the operating shaft whereby the operating shaft 12 is fixed. In this case, the spring force of the wound springs 17, 17' or the twisting degree of the operating shaft 12 is properly selected whereby the turning elastic force of the springs 17, 17' and the weight of the lid plate 3 are properly balanced, and with this balancing, when the lid plate 3 is opened or closed, the gravity of the lid plate 3 becomes extremely light so that the lid plate 3 can be made stationary at an arbitrary position within an allowable angle of opening/closing controlled by the guide notched portions 16, 16'. As a result, the lid plate 3 is caused to be almost weightless and can be maintained at an arbitrary position. The lid plate 3 can be closed by holding the predetermined gap in the space provided by flange portion 8 of the hollow portion 9 formed on the opening portion 2 when the lid plate 3 is closed.

As described in the foregoing, the opening/closing mechanism of the lid plate 3 can be installed by utilizing the technical means of the prior art such as giving the clamping resistance to the support shaft of the lid plate 3 or mounting a draw spring between the lid plate 3 and the lid C.

Accordingly, the present invention is constructed in such a way that the cooking food for frying is charged into the opening formed when the lid plate 3 is lifted from the lid closed condition, and then the lid plate covers the opening (the application of the lid can be easily performed since the opening/closing resistance of the lid is extremely small), but during the cooking time, the vapor or the gas from the frying pan proper P starts to develop in large volume, and the vapor and gas make curved flow to the outside through the ventilating gap S formed with the lid plate 3 from the opening portion 2 of the lid and further from the ventilating gap formed between the top end of the lid plate 3 and the lid C and is discharged. As a result, there is no chance of spoiling the see-through property due to the vapor or the gas or oil smoke in the frying pan, and the upper space in the frying pan P is almost completely covered with the lid C, so that the larger part of the oil splashing moving straight forward collides with the inner surface of the lid C (as shown in FIG. 4) to reflect to the inside whererby no splashing occurs, and although the lid C is unable to completely seal, it has only a minimum space performing the curved flow discharging function of the gas. During the cooking time, and the air does not flow from the outside into the inside, so that in the lid closed condition, the inside of the frying pan contains very little oxygen, and even if the oil temperature rises to any degree, there is no danger of combustion. Even if the person cooking should leave the kitchen for long hours carelessly or on account of an ermergency matter, there is no apprehension that the frying pan will be enveloped in flames. Also, the present invention is therefore very valuable in solving two big problems, namely, the oil splashing of the frying of the cooking food and fire prevention.

Figure 5:
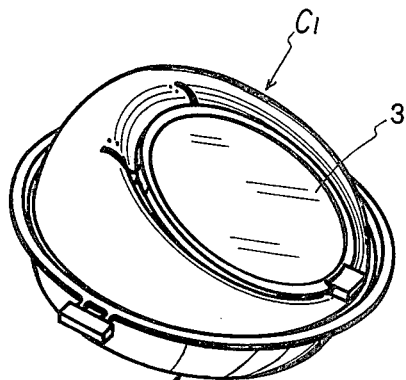
FIG. 5 is a perspective view showing another embodiment related to the present invention.
Figure 6:
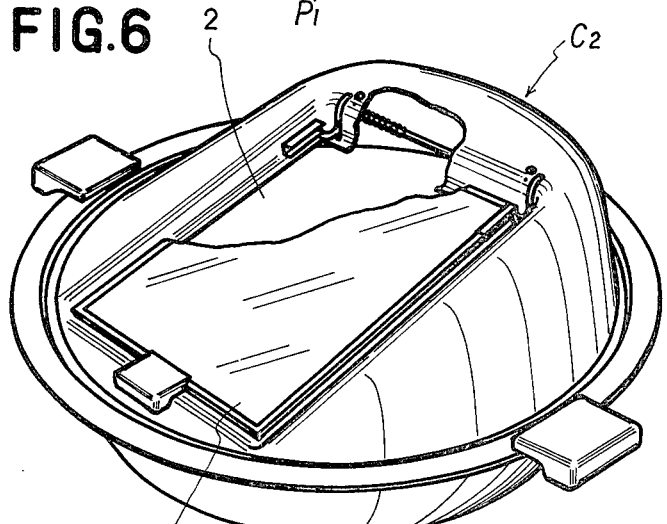
FIG. 6 is a perspective view showing another embodiment related to the present invention and showing the part of the lid plate being cut away.

FIGS. 4 and 6 show other embodiments related to the present invention, and the lids $C_1$ and $C_2$ are shaped in circular form to be used in the circular frying pan $P_1$. In FIG. 5, the opening portion 2 of the lid $C_1$ is cut out in circular form, and the lid plate 3 is shaped in circular form in correspondence to the opening portion 2, and in FIG. 6, the opening portion 2 of the lid $C_2$ is cut out in rectangular form, and the lid plate 3 is shaped in rectangular form in correspondence to the opening portion 2. As described in the foregoing, the oil splashing function and fire preventing function of the frying pan $P_1$ can be achieved even though the lid is shaped in circular form according to the shape of the frying pan or the lid is shaped in circular form or rectangular form according to the shape of the opening portion.

Figure 7:
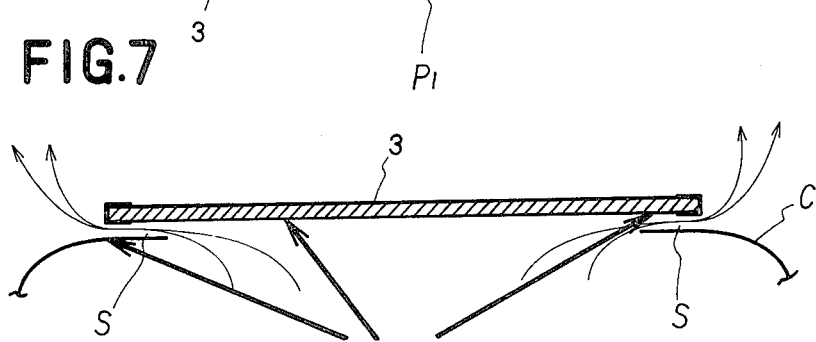
FIG. 7 is a cross section of an essential part of another embodiment wherein the lid plate is mounted on the opening portion of the lid, and showing the condition where the gas developed inside of the frying pan proper is caused to move in curved flow and discharged through a gap formed between the opening portion of the lid and the lid plate.

Furthermore, FIG. 7 shows another embodiment illustrating the gas discharging mechanism, and the edge of the opening portion 2 of the lid is formed outside the hollow portion 9. The outer edge of the lid plate 3 is formed to a dimension sufficiently covering the edge of the opening portion 2 and a predetermined gap is formed between the edge of the opening portion 2 and the outer edge of the lid plate 3 when the lid plate 3 is closed. The upper area of the frying pan proper P is almost completely covered with the lid C, and the major parts of the oil splashing flowing straight forward collides with either the inner surfaces of the lid C and is reflected inwardly so that there is no chance for the oil splashing to move outside, and yet the lid C is not in completely closed condition, and it can hold the minimum space for performing the curved gas discharging function.

What is claimed is:

1. A lid device for preventing oil splashing and the occurrence of a fire in an upwardly concave frying pan, that has an upper perimeter edge portion, said lid device having
  (a) generally upwardly convex cover portion that terminates in a lower perimeter edge portion which lies in a plane and that is adapted to engage the upper perimeter edge portion of a frying pan;
  (b) an opening in an inclined portion of said upwardly convex cover portion which is large enough for the introduction of food to be cooked, said opening being in a plane which is inclined with respect to a plane passing through the lower perimeter edge portion of said cover portion;
(c) a transparent plate that is at least as great in area as the area of said opening, said transparent plate having an outer perimeter;
(d) a hinge means connecting said transparent plate to said cover portion so that said transparent plate can be moved from a closed position overlying said opening to an open position allowing access through said opening, and
(e) a circumferential passageway formed between the outer perimeter of said transparent plate and the inner perimeter of said opening when said transparent plate is in its closed position with respect to said cover portion, said passageway serving as an outlet for gases and vapors generated in a frying pan.

2. A device according to claim 1 wherein said cover includes a recessed portion around the periphery of said opening.

3. A device according to claims 1 and 2 wherein said hinge means includes springs wound on a rotatable shaft.

* * * * *